J. R. Pond,
Milk House.
No. 95,723. Patented Oct. 12, 1869.
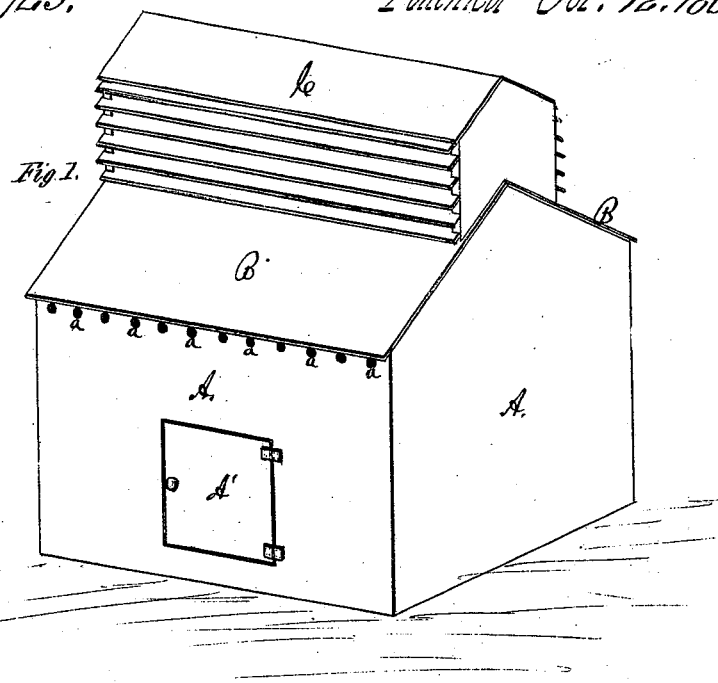
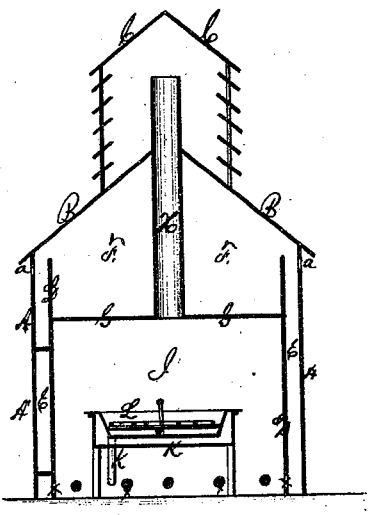
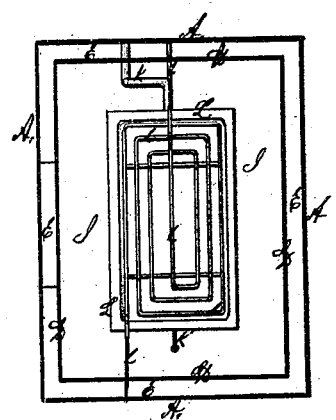
Witnesses:
A. E. L. Searle
N. O. Bond
Inventor:
Julius R. Pond
by Prindle and Dyer, attys.

United States Patent Office.

JULIUS R. POND, OF NEW HARTFORD, CONNECTICUT.

Letters Patent No. 95,723, dated October 12, 1869.

IMPROVEMENT IN MILK-HOUSES.

The Schedule referred to in these Letters Patent and making part of the same.

*To all whom it may concern:*

Be it known that I, JULIUS R. POND, of New Hartford, in the county of Litchfield, and State of Connecticut, have invented certain new and useful Improvements in the Method and Mechanism for Treating Milk; and do hereby declare that the following is a full, clear, and exact description of the same, reference being had to the accompanying drawing, making a part of this specification, in which—

Figure 1 is a perspective view of my milk-house;
Figure 2 is a vertical central cross-section; and
Figure 3 is a horizontal section of the same.

Like letters, of like name and kind, refer to like parts in each of the figures.

Milk-rooms known prior to this invention were used chiefly to protect the milk, and were not especially adapted to hasten the separation of the cream, or for the preservation of the milk for use after the cream was removed. Cream rises with varying degrees of rapidity and perfection in a hot or cold, moist or dry, stationary or moving atmosphere. In great cold, and also in a still, damp air, the separation is slow and imperfect, and in various electric states of the atmosphere the milk sours quickly.

To obviate the difficulties is the object of my invention, which consists in providing a suitable room, having double walls, between which is a space containing a column of substantially dead air, or other suitable non-conductor of heat, for the purpose of securing a uniform temperature and humidity within said room, regardless of the changes in the external atmosphere.

It also consists in the apparatus employed for containing, warming, or cooling the milk, whereby the exact degree of temperature found desirable for such milk may be secured with certainty and convenience, as will be more fully described hereinafter.

In the annexed drawing—

A A, &c., represent the outer walls, and B the roof of my milk-house, upon which is an elevated roof, C, the vertical sides of which are provided with slats or lattice-work.

Situated at from eight to ten inches from the outer wall A is an inner wall, D D, &c., extending from the foundation to within a short distance of the roof, leaving an air-space, E E, between said walls, which communicates with the space within the upper part of the building, F, between the roof and the ceiling G.

Immediately beneath the eaves are a series of annular openings, $a$ $a$, &c., through which air is admitted, and circulates through the spaces E E and F, while other openings, $x$ $x$, &c., are made through the inner walls, near the floor, so as to admit the cool air to the base of the room, I, by which arrangement the air entering said room is free from all impurities which would be contained in that taken from near the surface of the ground.

A series of flues, H, extends from the top of the room I, through the roof B B, and terminate in an open end within the elevated roof C C, to permit of the escape of heated air from said room.

K represents a trough, placed in the centre of the room I, and supported upon legs, or in any suitable manner.

A pipe, $k$, passes through the walls of the building, and enters said trough at one side, while another pipe, $k'$, passes out of the opposite side of said trough, and downward through the floor.

A shallow pan, L, is fitted to said trough K, upon the top of which it rests, by means of a projecting flange, so as to leave a space between the sides and bottoms of said trough and pan.

A pipe, $l$, is coiled in the pan, being supported upon cross-bars, midway between its top and bottom, and its ends pass out, in opposite directions, through the walls of the building.

The operation of this device is as follows:

The pan L being filled with milk, a stream of hot air or steam is caused to enter the trough or jacket K, through the pipe $k$, and raise the temperature of said milk to the most favorable point for the separation of the cream, which gives a motion to the milk similar to that immediately preceding boiling, and creates a partial vacuum over its surface, by the upward motion of the heated air, which passes through the ventilator H, carrying with it all of the moisture caused by the evaporation of the milk.

The air entering through the openings $a$ $a$ and $x$ $x$ in the walls of the building, keeps the atmosphere at all times pure and fresh, the reverse of which is a common cause of the early souring of milk.

Should the temperature of the milk rise above the desired point, it may be reduced by passing a stream of cold water through the pipe $l$.

The milk is preferably introduced to the pan by means of a pipe extending from outside of the room; but in order that it may be poured in, if desired, and also to permit of access to the room, for the purpose of cleansing the said apparatus, a door, A', is provided, said door being, like the walls, double.

In the event of the use of steam for raising the temperature of the milk, some condensation may take place upon the bottom of the pan L, in which event the water can escape through the pipe $k'$, the lower end of which should be immersed in water, or provided with an S-shaped crook, for the purpose of retaining sufficient water to prevent the admission of air through said pipe.

Having thus fully set forth the nature and merits of my invention,

What I claim as new, and desire to secure by Letters Patent, is—

1. The arrangement of the double walls A and D, air-space E, openings *a a*, &c., and *x x*, &c., and ventilators H, for the purpose of ventilating a milk-room, substantially as herein shown and described.

2. Also, the chamber I, rendered as nearly airtight as practicable, by the use of double or other non-conducting walls, in combination with the mechanism for controlling the temperature of said room, consisting of the pipes *k k'* and *l*, all constructed and arranged substantially as and for the purpose shown.

3. Also, the within-described milk-house, consisting of the double walls A and D, with openings *a* and *x*, roofs B and C, ceiling G, and ventilator H, when constructed and arranged substantially as described, and for the purpose specified.

JULIUS R. POND.

Witnesses:
J. MILBANK,
J. V. BAGLEY.